E. B. Beecher, J. G. Davis, H. S. Frost & A. G. Davis,
Shutter Worker.
N° 63,835. Patented Apr. 16, 1867.
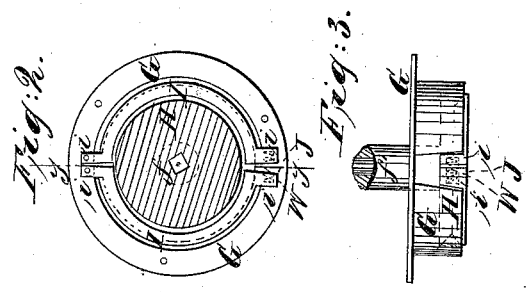
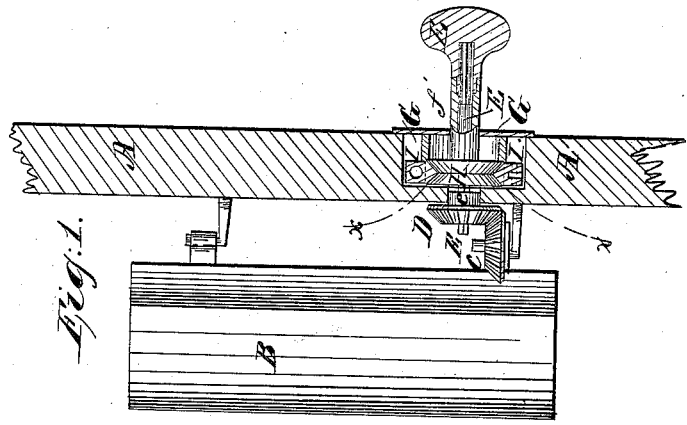
Witnesses:
Theo Tusche
Wm Truin
Inventor:
E B Beecher
J G Davis
H J Frost
A G Davis
Per Munn & Co
Attorneys

United States Patent Office.

EBENEZER B. BEECHER, OF WESTVILLE, AND JOSEPH G. DAVIS, HENRY S. FROST, AND ANTHONY G. DAVIS, OF WATERTOWN, CONNECTICUT.

Letters Patent No. 63,835, dated April 16, 1867.

IMPROVED BLIND-FASTENING.

The Schedule referred to in these Letters Patent and making part of the same.

TO ALL WHOM IT MAY CONCERN:

Be it known that we, EBENEZER B. BEECHER, of Westville, in the county of New Haven, and State of Connecticut, and JOSEPH G. DAVIS, HENRY S. FROST, and ANTHONY G. DAVIS, of Watertown, in the county of Litchfield, and State of Connecticut, have invented a new and useful Improvement in Blind-Fastening; and we do hereby declare that the following is a full, clear, and exact description thereof, which will enable others skilled in the art to make and use the same, reference being had to the accompanying drawings, forming part of this specification, in which—

Figure 1 is a vertical section of a window-casing to which our improved fastening has been attached.

Figure 2 is a detail sectional view of the same taken through the line $x\ x$, fig. 1.

Figure 3 is a side view of the cap or case by means of which the fastening is locked.

Similar letters of reference indicate like parts.

Our invention has for its object to furnish a simple and convenient means by the use of which a blind or shutter may be securely locked in any desired position; and it consists in the combination of a grooved pulley or friction-wheel, two semicircular clamps or brakes, and a slotted cap or case with each other, with the shank of the knob or handle, and with the gear-wheel shaft, the whole being constructed and arranged as hereinafter more fully descri!.

A is the window-casing, and B is a blind or shutter, which is hinged to the casing A in the ordinary manner. C is a bevel gear-wheel, which is formed upon or attached to the eye of the lower hinge, as shown in fig. 1, and the teeth of which mesh into the teeth of the bevel gear-wheel D pivoted to the window-casing, and which is kept in place by the gear-wheel C, and by a shoulder, $e'$, formed upon the square shaft E. The shaft E passes through the casing A, and into a deep square hole formed in the shank $f'$ and knob or handle F. This hole extends deep into the knob F, so that the shaft E may be made long enough to adapt it to casings of various thicknesses. The shaft E is not attached to the knob F, but the said knob is secured in place by the cap or case G. Upon the inner end of the shank $f'$ of the knob F is formed, or to it is securely attached, a friction-wheel or pulley, H, the face of which is grooved with an angular groove, as shown in figs. 1 and 3. I is a pair of semicircular clamps or brakes, having projecting ears, $i$, formed upon their ends, by means of which they are hinged to each other at one end, and between which ears, at their other ends, is placed a coiled wire spring, J, or equivalent, to force them apart when released, and thus diminish the friction upon the wheel H. The inner or concave faces of the clamps or brakes I are made angular or wedge shaped, as shown in fig. 1, so as to clamp the wheel H and lock the blind in any desired position. G is a case or cap let into and secured to the casing A upon the inner side of the window. The inner part of this cap or case G has tapering slots formed upon its opposite sides which receive the ears $i$ of the clamps or brakes I, and which, as the said clamps and wheel H are drawn inward by pulling upon the knob F, force the said clamps into closer contact with the wheel H, and lock the blind in any desired position. Upon pushing the knob F outward, the clamps I are released from the case G by being moved back into the wider part of the slots in said cap. The clamps I are at the same time forced apart by the spring J releasing the wheel H and allowing the blind to be moved in either direction by turning the knob F.

We disclaim the parts the subject-matter of the patent of William Maguire, dated January 1, 1850.

What we claim as new, and desire to secure by Letters Patent, is

1. The combination of the grooved friction-wheel or pulley H, the two semicircular clamps or brakes I, and the slotted cap or case G, with each other, with the shank of the knob or handle F and with the shaft E of the gear-wheel D, substantially as herein shown and described.

2. The shaft E, connected to the gear-wheel D and to the knob or handle F, in the manner herein shown and described and for the purpose set forth.

EBENEZER B. BEECHER,
JOSEPH G. DAVIS,
HENRY S. FROST,
ANTHONY G. DAVIS.

Witnesses:
GEO. L. FIELDS,
AUGUSTUS N. WOOLSON.